US006675430B2

(12) United States Patent
Hamamoto

(10) Patent No.: US 6,675,430 B2
(45) Date of Patent: Jan. 13, 2004

(54) WIPER DEVICE FOR VEHICLE HAVING WIPER BLADE LIFTING MECHANISM

(75) Inventor: Jun Hamamoto, Kosai (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 10/228,046

(22) Filed: Aug. 27, 2002

(65) Prior Publication Data

US 2003/0046784 A1 Mar. 13, 2003

(30) Foreign Application Priority Data

Sep. 12, 2001 (JP) ........................................ 2001-276064

(51) Int. Cl.[7] ................................ B60S 1/32; B60S 1/40
(52) U.S. Cl. ................................ 15/250.19; 15/250.32; 15/250.351
(58) Field of Search ................ 15/250.19, 250.001, 15/250.351, 250.352, 250.23, 250.361, 250.16, 250.32

(56) References Cited

U.S. PATENT DOCUMENTS 4,765,019 A * 8/1988 Ochino ................. 15/250.19
5,101,531 A * 4/1992 Edwards et al. ......... 15/250.19
5,628,084 A * 5/1997 Chen ........................ 15/250.19
5,720,072 A * 2/1998 Boissac ..................... 15/250.19
5,774,927 A * 7/1998 Morin ....................... 15/250.19
6,253,409 B1   7/2001 Terai ......................... 15/250.19

FOREIGN PATENT DOCUMENTS

JP    A-2000-289577    10/2000

* cited by examiner

*Primary Examiner*—Gary K. Graham
(74) *Attorney, Agent, or Firm*—Posz & Bethards, PLC

(57) ABSTRACT

In a wiper device for vehicles, a wiper blade is rotatably held on a retainer of a wiper arm through a holding axis. A slider is integrated with an end of a primary lever of the wiper blade. The slider is arranged at a position being shifted toward the wiper arm from the holding axis. The retainer has a longitudinal base wall and a first and second side walls extending from opposite side edges of the base wall, to have substantially a U-shaped cross-section opening toward a wiping surface. A slider base, a posture maintaining portion and the end of the primary lever are provided to be retractable in a U-shaped cavity of the retainer. While the wiper blade is lifted with the slider, the wiper blade is held at a predetermined posture with respect to the retainer.

16 Claims, 5 Drawing Sheets

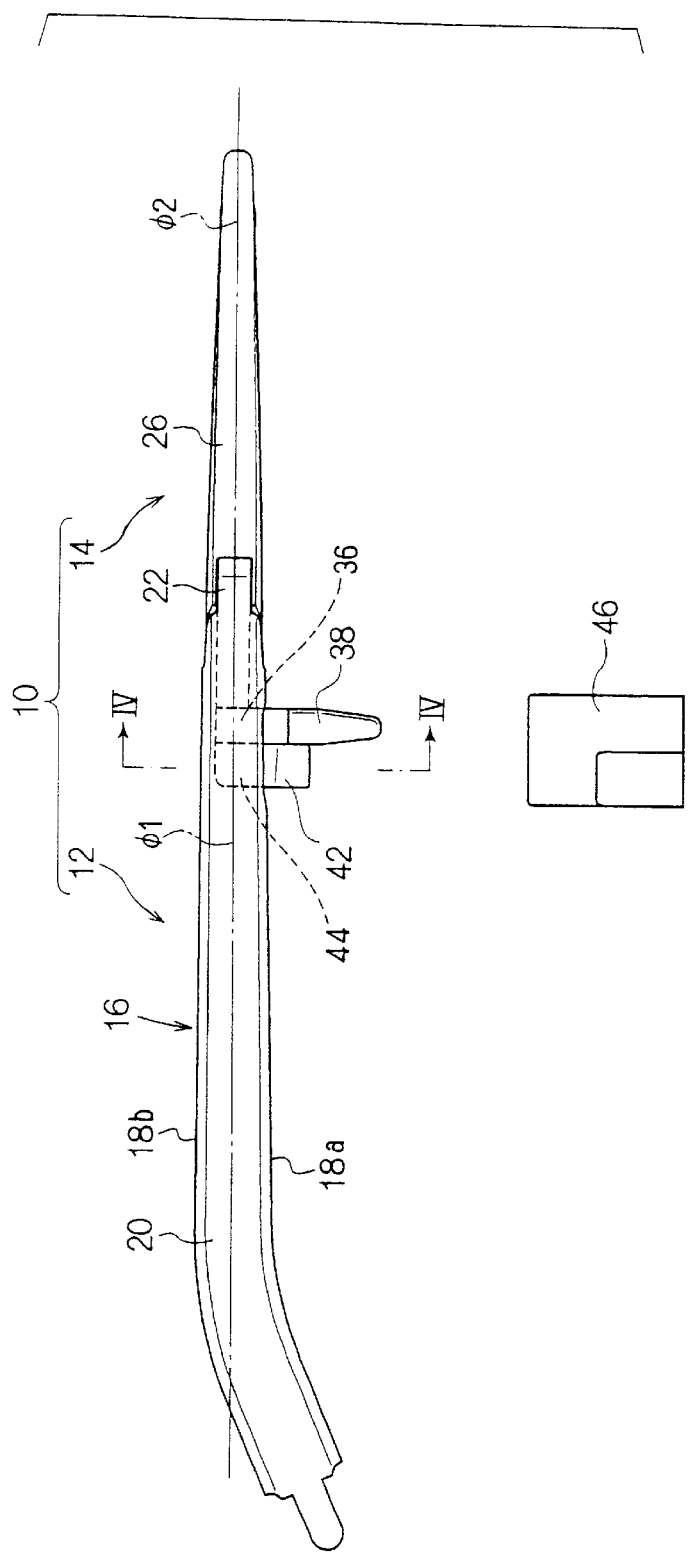

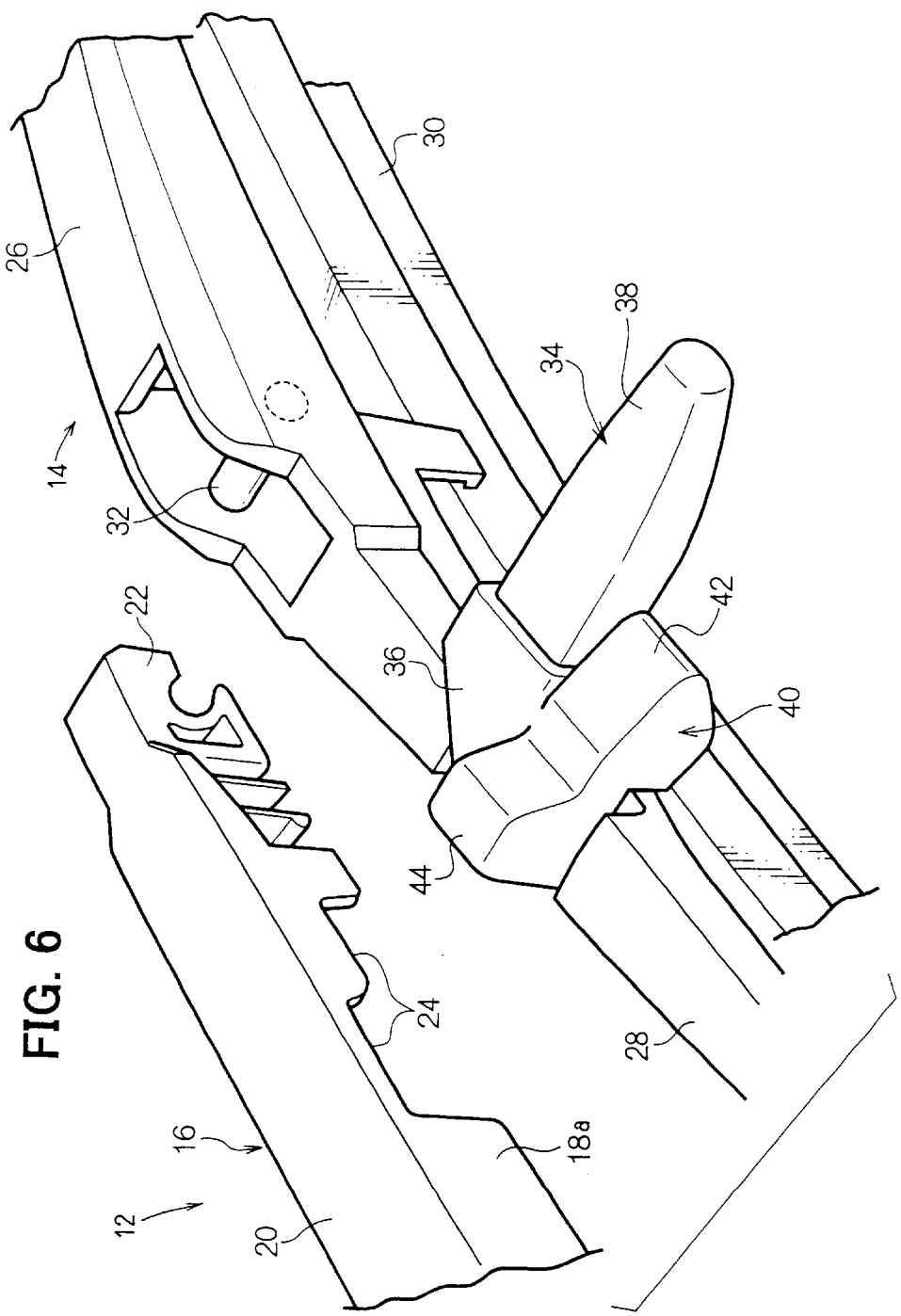

WIPER DEVICE FOR VEHICLE HAVING WIPER BLADE LIFTING MECHANISM

CROSS REFERENCE TO RELATED APPLICATION

This application is based on and claims the benefit of priority of Japanese Patent Application No. 2001-276064 filed on Sep. 12, 2001, the disclosure of which is incorporated herein by reference.

FIELD OF THE INVENTION

The present invention relates to a wiper device for a vehicle for wiping a window glass surface of the vehicle.

BACKGROUND OF THE INVENTION

In a vehicular wiper device for wiping a windshield, a wiper blade is generally pressed against the windshield by an arm pressure of a wiper arm for a long time while the wiper device is turned off. As a result, a blade rubber is likely to be deformed. For example, a wiper device disclosed in JP-A-2000-289577 has a mechanism for lifting up a wiper blade to suppress the deformation of the blade rubber.

In a wiper device having such a lifting mechanism, a sliding unit is fixed to a wiper blade rotatably held on a wiper arm through a holding axis. A lifter is attached on a vehicle body adjacent to a wiper blade's stationary position. When the wiper device is turned off and the wiper blade is returned to the stationary position, the sliding unit is mounted on the lifter so that the wiper blade is lifted. In this way, the deformation of the blade rubber is decreased.

In this kind of lifting mechanism, a rivet or screw is required to fix the sliding unit to the wiper blade. In addition, the lifted wiper blade is likely to rotate about the holding axis due to vibration of the vehicle, especially, while the vehicle is running over bad roads. As a result, ends of the wiper blades contact the vehicle body, thereby causing rattling noises.

To suppress the rattling noises, for example, a wiper blade is held with an E-clip fixed at the end of a wiper arm. Further, a Z-shaped plate spring stopper is placed between the E-clip and the wiper blade so that a rotation of the wiper blade is restricted with a biasing force of the plate spring stopper. As another example, the wiper blade is held in a state that the wiper blade is positively in contact with the wiper arm while being lifted to prevent the wiper blade from rotating.

In the above wiper devices, however, additional parts such as the E-clip and the plate spring stopper are required to hold the wiper blade. With this, the number of parts and assembling steps are increased, resulting in an increase of a manufacturing cost. Further, in a case that the sliding unit fixed on the wiper blade is exposed largely, an external appearance is lessened.

SUMMARY OF THE INVENTION

The present invention is made in view of the above disadvantages and an object of the present invention is to provide a wiper device for vehicles in which a wiper blade is lifted without vibrating to suppress rattling noises.

Another object of the present invention is to provide a wiper device with an enhanced appearance.

Further another object of the present invention is to provide a wiper device in which the number of parts is reduced and an assembling workability is improved.

In a wiper device of the present invention, a wiper blade is rotatably held at an end of a wiper arm through a holding axis. The wiper arm has a longitudinal base wall and a first and second side walls extending from longitudinal edges of the base wall, so that the wiper arm has substantially a U-shaped cavity opening toward a wiping surface. The wiper blade is pressed toward the wiping surface with an arm pressure exerted from the wiper arm. The wiper blade reciprocates with a rotation of the wiper arm and wipes the wiping surface. A slider is provided on the wiper blade at a position being shifted from the holding axis toward the wiper arm. A slider base of the slider and a portion of the wiper blade having the slider base are provided to be retractable in the cavity. A sliding protrusion of the slider protrudes toward a wiper blade's stationary position.

When the wiper device is turned off and the wiper blade is returned to the stationary position, the sliding protrusion runs onto a lifter mounted on the vehicle so that the wiper blade is lifted in a direction separating from the wiping surface.

According to the wiper device, since the slider is provided on the wiper blade at a position being shifted toward the wiper arm from the holding axis, when the wiper blade is lifted, a rotational force about the holding axis is generated on the wiper blade. At this time, the slider base and the portion of the wiper blade having the slider base are moved toward an inner surface of the base wall of the wiper arm. The wiper blade contacts with the wiper arm at a point different from the holding axis.

Since the arm pressure is applied to the wiper arm, the wiper blade is pressed against the lifter through the contact point. With this, the wiper blade is held in a state that the rotation about the holding axis is limited at the contact point. Accordingly, even when a blade rubber of the wiper blade is completely separated from the wiping surface, the wiper blade is securely held against the wiper arm without vibrating, thereby suppressing rattling noises.

Further, when the wiper blade is lifted, that is, when the slider base and the portion of the wiper blade having the slider base are moved toward the base wall with the rotational force about the holding axis, the slider base and the portion of the wiper blade having the slider base are retracted in the cavity. Therefore, an external appearance of the wiper device is improved.

BRIEF DESCRIPTION OF THE DRAWINGS

Other objects, features and advantages of the present invention will become more apparent from the following detailed description made with reference to the accompanying drawings, in which:

FIG. 3 is a front view of the wiper device according to the embodiment of the present invention;

FIG. 6 is an exploded perspective view of the main part of the wiper device according to the embodiment of the present invention.

DETAILED DESCRIPTION OF THE PREFERRED EMBODIMENTS

A preferred embodiment of the present invention is described hereinafter with reference to drawings.

Figures 1, 2:
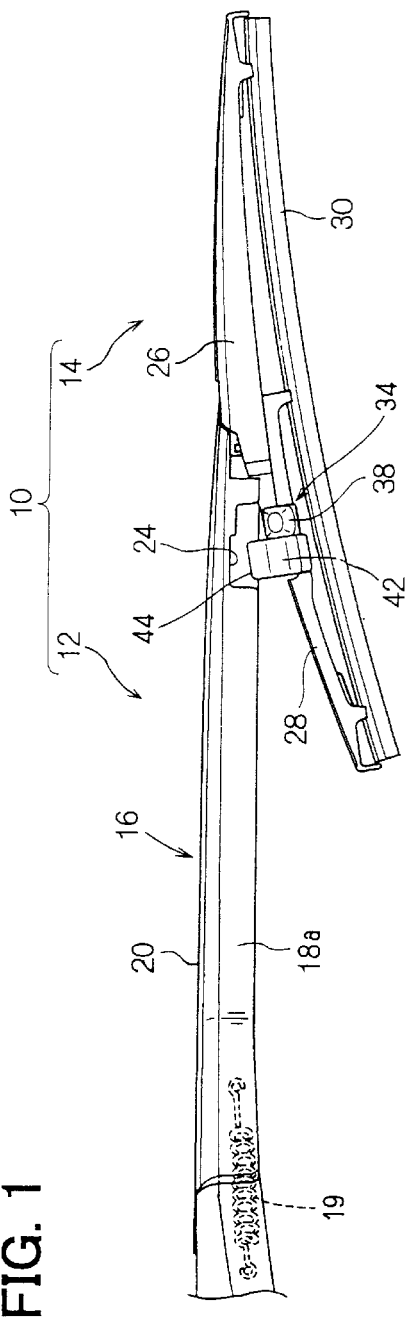
FIG. 1 is a side view of a wiper device according to an embodiment of the present invention.
FIG. 2 is a side view of a main part of the wiper device according to the embodiment of the present invention.

Referring to FIG. 1, a wiper device 10 for a vehicle has a wiper arm 12 and wiper blade 14. The wiper arm 12 has a retainer 16 and an arm head (not shown). A first end of the arm head is fixed on a pivot shaft (not shown) mounted on the vehicle. A first end of the retainer 16 is rotatably connected to a second end of the arm head with a hinge.

The retainer 16 is made of resin. The retainer 16 has a longitudinally extending base wall 20 and a first and second side walls 18a and 18b extending from longitudinal edges of the base wall 20. The retainer 16 has substantially a U-shaped cavity X in cross section opening toward a wiping surface of a window glass. A second end of the retainer 16 is provided with a hook 22, as shown in FIGS. 3 and 6. The first side wall 18a is formed with a cutout 24 adjacent to the hook 22. The cutout 24 is shaped to correspond to a sliding protrusion 38 of a slider 34 and a cushioning portion 42 of a holding block 40.

An extension coil spring 19 is provided in the cavity X between the retainer 16 and the arm head. An arm pressure is applied to the retainer 16 of the wiper arm 12 with a biasing force of the spring 19, so that the wiper blade 14 is pressed toward the wiping surface.

The wiper blade 14 has a primary lever 26, secondary lever 28 and blade rubber 30. The primary lever 26 is made of resin. The primary lever 26 has a first end on a wiper arm 12 side and a second end. As shown in FIGS. 2 and 6, the primary lever 26 has a holding axis 32 adjacent to the first end. The hook 22 of the retainer 16 is hooked on the holding axis 32 so that the wiper blade 14 is held to be rotatable with respect to the wiper arm 12 within a predetermined range.

As shown in FIG. 3, the wiper arm 12 and the wiper blade 14 are connected in such a manner that a longitudinal axis $\phi 1$ of the wiper arm 12 and a longitudinal axis $\phi 2$ of the wiper blade 14 are aligned when the wiper device 10 is viewed from a front side.

Figure 5:
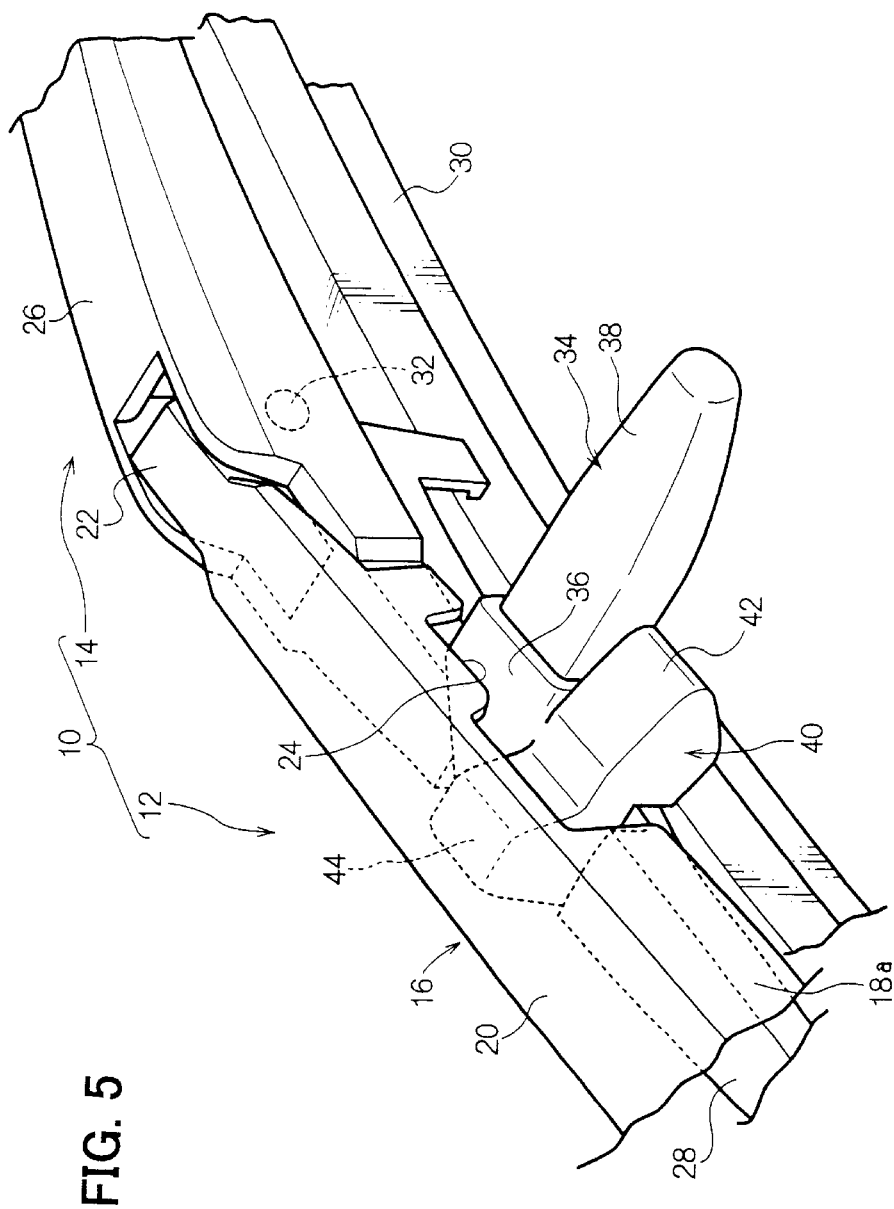
FIG. 5 is an enlarged perspective view of the main part of the wiper device according to the embodiment of the present invention.

The primary lever 26 has the slider 34 at the first end, as shown in FIGS. 5 and 6. The sliding protrusion 34 is made of resin and integrally formed with the primary lever 26. The slider 34 includes a slider base 36 and the sliding protrusion 38. The slider base 36 is shifted from the holding axis 32 toward the wiper arm 12. The sliding protrusion 38 protrudes in a direction substantially perpendicular to the longitudinal axis $\phi 2$ of the wiper blade 14. Specifically, the sliding protrusion 38 protrudes in a direction that the wiper blade 14 moves to return to a stationary position.

Figure 4:
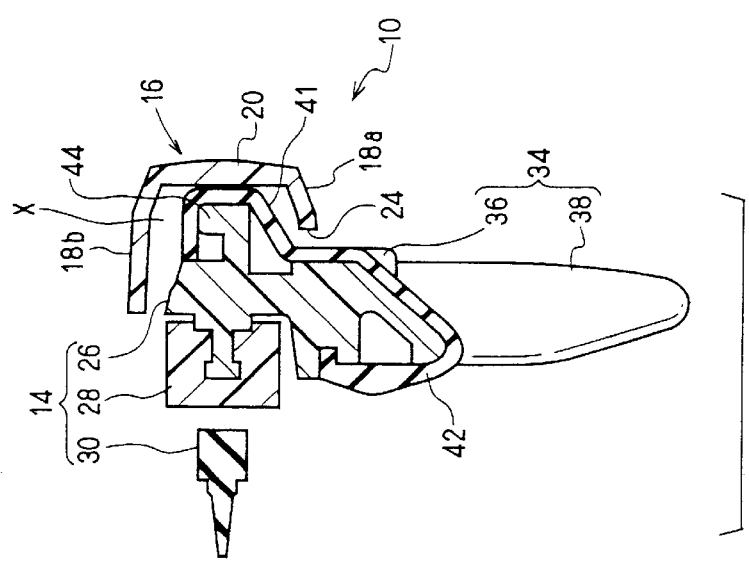
FIG. 4 is a cross-sectional view of the main part of the wiper device taken along line IV—IV in FIG. 3.

The slider 34 has the holding block 40. The holding block 40 includes the cushioning portion 42 and a posture maintaining portion 44. The cushioning portion 42 and the posture maintaining portion 44 are covered with a rubber cover 41 and integrated with the slider base 36, as shown in FIG. 4. The cushioning portion 42 protrudes in a same direction as the sliding protrusion 38 adjacent to the sliding protrusion 38. The cushioning portion 42 has functions of absorbing shock and positioning the wiper blade 14 at the stationary position when the wiper blade 14 is lifted. The posture maintaining portion 44 protrudes toward the base wall 20 of the wiper arm 12, as shown in FIG. 5. The posture maintaining portion 44 can contact with the inner surface of the base wall 20. That is, when the wiper blade 14 is lifted, the posture holding portion 44 contacts with the inner surface of the base wall 20 so that the wiper arm 12 is moved up with the wiper blade 14 and the wiper blade 14 is maintained at the predetermined posture or position with respect to the wiper arm 12.

As described above, the wiper arm 12 and the wiper blade 14 are connected such that the longitudinal axes $\phi 1$ and $\phi 2$ are aligned. In addition, the posture maintaining portion 44 is positioned on the longitudinal axes $\phi 1$ and $\phi 2$ when it is viewed from the front side.

The slider base 36, the first end the primary lever 26 having the slider base 36, and the posture maintaining portion 44 are provided to be retractable in the cavity X. The first side wall 18a, which is closer to a lifter 46 than the second side wall 18b, has the cutout 24 shaped to correspond to external shapes of the sliding protrusion 38 and the cushioning portion 42, as shown in FIG. 5. That is, the cutout 24 is shaped such that the sliding protrusion 38 protruding substantially perpendicular to the wiper blade 14 does not contact with the first side wall 18a.

In the wiper device 10, the wiper arm 12 reciprocates with a rotation of the pivot shaft, so that wiper blade 14 supported by the wiper arm 12 wipes the window glass.

Figure 7:
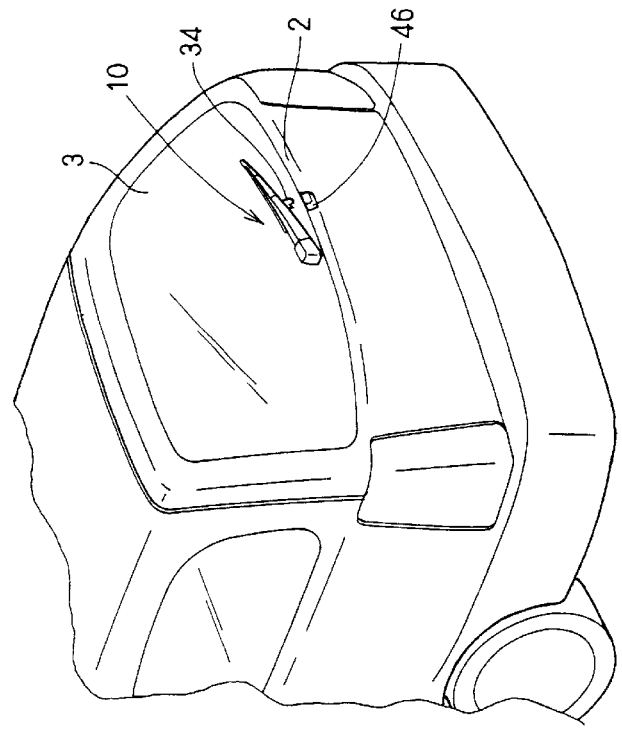
FIG. 7 is a schematic illustration of the wiper device mounted on a vehicle, according to the embodiment of the present invention.

The lifter 46 is mounted on the vehicle body adjacent to a window glass frame. The lifter 46 is arranged to correspond to the slider 34 when the wiper blade 14 is positioned at the stationary position. For example, the wiper device 10 can be used to wipe a rear window glass 3 of the vehicle, as shown in FIG. 7. In this case, the lifter 46 is mounted adjacent to a rear window glass frame 2.

When the wiper device 10 is turned off and the wiper blade 14 is returned to the stationary position, the sliding protrusion 38 of the slider 34 mounts on the lifter 46. Therefore, the wiper blade 14 is lifted while the wiper device 10 is turned off. The lifter 46 has a height such that the blade rubber 30 of the wiper blade 14 is completely separated from the vehicle body or the window glass.

Next, operation of the present embodiment is described.

When the wiper device 10 is turned on, the wiper blade 14 reciprocates with the wiper arm 12 in accordance with the rotation of a motor (not shown), so the wiper blade 14 wipes the window glass 3.

When the wiper device 10 is turned off, the wiper arm 12 and the wiper blade 14 return to the stationary position. At this time, the sliding protrusion 38 mounts on the lifter 46, so the wiper blade 14 is lifted and the blade rubber 30 is completely separated from the window glass. While the wiper device is not operated, since the blade rubber 30 is not pressed against the window glass with the arm pressure, it is possible to suppress deformation or deterioration of the blade rubber 30.

When the wiper blade 14 is lifted, the wiper blade 14 is pressed at the holding axis 32 toward the vehicle body or window glass(in a direction of an arrow A in FIG. 2) with the arm pressure of the wiper arm 12. On the other hand, the wiper blade 14 is pressed with the lifter 46 in a direction separating from the lifter 46 (in a direction of an arrow B). Since the slider 34 is shifted toward the wiper arm 12 from the holding axis 32, a rotational force about the holding axis 32 in a direction of an arrow C is generated.

Therefore, the wiper blade 14 rotates in the direction of the arrow C. At this time, the posture maintaining portion 44 contacts with the inner surface of the base wall 20 and pushes the wiper blade 12, so that the wiper arm 12 moves with the wiper blade 14. Thus, the wiper blade 14 is held at the predetermined posture with respect to the wiper arm 12 while the rotation force in the arrow C direction is exerted.

More specifically, the wiper arm 12 is in contact with the wiper blade 14 at a point different from the holding axis 32. That is, the wiper arm 12 and the wiper blade 14 contact with each other through the posture maintaining portion 44 and the holding axis 32. At this time, since the arm pressure is exerted to the wiper arm 12, the wiper blade 14 is pushed toward the lifter 46 at the contact of the posture maintaining portion 44. Therefore, the wiper blade 14 is held in a state that the rotation of the wiper blade 14 about the holding axis 32 is limited with the contact of the posture maintaining portion 44. Accordingly, even when the wiper rubber 30 is completely separated from the wiping surface or the vehicle body, the wiper blade 14 is held without vibrating due to the vibration of the vehicle, thereby suppressing the rattling noise.

In the wiper device 10, the slider base 36 and the first end of the primary lever 26 having the slider base 36 are provided to be retractable in the cavity X of the retainer 16. When the wiper blade 14 is lifted, the slider 34 and the first end of the primary lever 26 are rotated or moved toward the wiper arm 12. Therefore, the slider base 36 and the first end are retracted in the cavity X of the retainer 16. In this way, since exposure of the slider base 36 and the first end is reduced, the external appearance is improved. Further, the wiper blade 14 is smoothly lifted.

Further, the first side wall 18a has the cutout 24 and the cutout 24 is shaped to correspond to the external shapes of the sliding protrusion 38 and the cushioning portion 42. Therefore, when the wiper blade 14 is lifted, the slider 34 other than the sliding protrusion 38, such as the slider base 36, and the posture maintaining portion 44 can be completely enclosed in the cavity X. Further, the sliding protrusion 38 and the cushioning portion 42 do not interfere with the first side wall 18a during the operation of the wiper device 10. Therefore, the wiper blade 14 properly rotates about the holding axis 32 and follows the shape of the wiping surface without being interrupted with the first side wall 18a.

When the sliding protrusion 38 runs onto the lifter 46 to lift up the wiper blade 14, the rotational force about the holding axis 32 is generated on the wiper blade 14. Specifically, the slider base 36, the posture maintaining portion 44 and the first end of the primary lever 26 are rotated about the holding axis 32 and moved toward the retainer 16. At this time, the posture maintaining portion 44 contacts with the inner surface of the base wall 20 and pushes the wiper arm 12 up. Further, since the arm pressure is exerted to the wiper arm 12, the wiper blade 14 is pushed toward the lifter 46 at the contact of the posture maintaining portion 44. Therefore, the wiper blade 14 is held in a state that the rotation of the wiper blade 14 about the holding axis 32 is limited with the contact of the posture maintaining portion 44. In this way, since the wiper blade 14 is lifted in the sate that the posture maintaining portion 44 contacts with the inner surface of the base wall 20, the distance or positional relationship between the wiper arm 12 and the wiper blade 14 is not changed while being lifted. Therefore, the wiper arm 12 and the wiper blade 14 are smoothly lifted while keeping posture.

In the wiper device 10, the slider 34 is integrated with the primary lever 26. Therefore, it becomes compact and the external appearance is improved. Further, screws or rivets are not required to fix a slider 34 to the wiper blade 14. With this, the number of parts and assembling steps are reduced. Further, it is not required to control the slider as a separate part. Since it is not required to fix the slider 34 onto the wiper blade 14, an assembling workability is improved and the external appearance is enhanced.

Furthermore, the wiper arm 12 and the wiper blade 14 are connected in such a manner that the longitudinal axes φ 1 and φ 2 are aligned. Also, the posture maintaining portion 44 is positioned on the longitudinal axes φ 1 and φ 2 when the wiper device is viewed from the front side. Therefore, a rotational surface of the wiper blade 14 with respect to the wiper arm 12, that is, the surface perpendicular to the holding axis 32 on the longitudinal axes φ 1 and φ 2, a lifting force for lifting the wiper arm 12 and the wiper blade 14 in a direction separating from the wiping surface, and a point where the rotational force is applied to the wiper arm 12 for the lifting are exerted on an identical surface. Therefore, it is decreased that the wiper device 10 is twisted at a connecting point between the wiper arm 12 and the wiper blade 14, such as at the holding axis 32, when the wiper arm 12 and the wiper blade 14 are lifted.

As descried above, in the wiper device 10 of the embodiment, the wiper blade 14 is securely held against the wiper arm 12 while being lifted, thereby suppressing the rattling noise. Further, the external appearance is improved. The number of parts is reduced, thereby improving the assembling workability.

The present invention should not be limited to the disclosed embodiments, but may be implemented in other ways without departing from the spirit of the invention.

What is claimed is:

1. A wiper device for a vehicle comprising:
   a wiper arm having a longitudinal base wall, a first and second side walls extending from opposite longitudinal edges of the base wall, wherein the wiper arm has a cavity having substantially a U-shaped cross-section and opens toward a wiping surface, and the wiper arm reciprocates and exerts an arm pressure acting toward the wiping surface;
   a wiper blade rotatably held at an end of the wiper arm through a holding axis, wherein the wiper blade is pressed toward the wiping surface with the arm pressure and reciprocates with the wiper arm for wiping the wiping surface;
   a slider provided on the wiper blade, wherein the slider has a slider base and a sliding protrusion, the slider base is arranged at a position being shifted from the holding axis toward the wiper arm, the slider base is disposed to be retractable in the cavity and the sliding protrusion protrudes from the slider base toward a stationary position of the wiper blade;
   a lifter attached to the vehicle adjacent to the stationary position of the wiper blade, wherein the sliding protrusion mounts on the lifter so that the wiper blade is lifted and separated from the wiping surface when the wiper blade is returned to the stationary position.

2. The wiper device according to claim 1, wherein the wiper blade includes a plurality of levers and the slider is integrally formed with one of the levers from a resin.

3. The wiper device according to claim 1, wherein the first side wall is formed with a cutout through which the sliding protrusion protrudes.

4. The wiper device according to claim 1, wherein the slider has a posture maintaining portion that is disposed to be in contact with an inner surface of the base wall for maintaining the wiper blade at a predetermined posture with respect to the wiper arm.

5. The wiper device according to claim 4, wherein the wiper arm and the wiper blade are aligned to have an identical longitudinal axis and the posture maintaining portion is arranged on the longitudinal axis.

6. The wiper device according to claim 1, wherein the slider has a cushioning portion and a posture maintaining portion and the cushioning portion and posture maintaining portion are covered with an elastic material.

7. The wiper device according to claim 6, wherein the cushioning portion protrudes adjacent to the sliding protrusion and contacts with the lifter for positioning the wiper blade at the stationary position when the sliding protrusion mounts on the lifter.

8. The wiper device according to claim 7, wherein the cushioning portion absorbs a shock when the wiper blade is lifted.

9. The wiper device according to claim 1, wherein the wiping surface is a rear window glass surface of the vehicle, the lifter is positioned adjacent to a rear window glass frame and the wiper blade is arranged such that its stationary position is adjacent to the frame.

10. A wiper device for a vehicle comprising:
 a wiper arm having a longitudinal base wall, a first and second side walls extending from opposite longitudinal edges of the base wall to define a cavity having substantially a U-shaped cross-section opening toward a wiping surface, and a biasing means provided in the cavity for exerting an arm pressure acting toward the wiping surface;
 a wiper blade rotatably held at an end of the wiper arm through a holding axis, wherein the wiper blade is pressed toward the wiping surface with the arm pressure;
 a slider integrated with the wiper blade, wherein the slider is arranged at a position being shifted from the holding axis toward the wiper arm and has a first protrusion and a second protrusion, the first protrusion protruding from the wiper blade substantially perpendicularly and the second protrusion protruding toward an inner surface of the base wall in the cavity; and
 a lifter attached to a vehicle, wherein the first protrusion mounts on the lifter and the second protrusion contacts the inner surface of the base wall so that the wiper blade is lifted and separated from the wiping surface while maintaining its posture with respect to the wiper arm when the wiper device is turned off and the wiper blade is placed at a stationary position.

11. The wiper device according to claim 10, wherein the second protrusion and a portion of the wiper blade having the slider are disposed to be retractable in the cavity.

12. The wiper device according to claim 10, wherein the first side wall is formed with a cutout through which the first protrusion protrudes.

13. The wiper device according to claim 10, wherein the wiper arm and wiper blade are connected to have an identical longitudinal axis and the second protrusion of the slider is arranged on the longitudinal axis.

14. The wiper device according to claim 10, wherein the slider has a third protrusion protruding adjacent to the first protrusion, and the third protrusion contacts the lifter for positioning the wiper blade at the stationary position and absorbs a shock when the wiper blade is lifted.

15. The wiper device according to claim 14, wherein the second and third protrusions are covered with an elastic material.

16. The wiper device according to claim 10, wherein the lifter is positioned adjacent to a rear window glass frame and the wiper blade is arranged such that the stationary position is adjacent to the rear window glass frame.

* * * * *